US009317770B2

(12) United States Patent
Ding et al.

(10) Patent No.: US 9,317,770 B2
(45) Date of Patent: Apr. 19, 2016

(54) METHOD, APPARATUS AND TERMINAL FOR DETECTING IMAGE STABILITY

(71) Applicant: Tencent Technology (Shenzhen) Co., Ltd., Shenzhen, Guangdong (CN)

(72) Inventors: Jian Ding, Guangdong (CN); Xiao Liu, Guangdong (CN); Hailong Liu, Guangdong (CN); Bo Chen, Guangdong (CN)

(73) Assignee: TENCENT TECHNOLOGY (SHENZHEN) CO., LTD., Shenzhen, Guangdong (CN)

( * ) Notice: Subject to any disclaimer, the term of this patent is extended or adjusted under 35 U.S.C. 154(b) by 44 days.

(21) Appl. No.: 14/281,387

(22) Filed: May 19, 2014

(65) Prior Publication Data
US 2014/0321747 A1 Oct. 30, 2014

Related U.S. Application Data

(63) Continuation of application No. PCT/CN2013/085549, filed on Oct. 21, 2013.

(30) Foreign Application Priority Data

Apr. 28, 2013 (CN) .......................... 2013 1 0156199

(51) Int. Cl.
*G06K 9/46* (2006.01)
*G06K 9/03* (2006.01)
(Continued)

(52) U.S. Cl.
CPC .............. *G06K 9/4604* (2013.01); *G06K 9/036* (2013.01); *G06T 7/00* (2013.01); *H04N 5/23254* (2013.01); *G06T 2207/10016* (2013.01); *G06T 2207/20021* (2013.01); *G06T 2207/30168* (2013.01)

(58) Field of Classification Search
None
See application file for complete search history.

(56) References Cited

U.S. PATENT DOCUMENTS 5,886,742 A * 3/1999 Hibi ........................ G06T 9/008
348/699
6,025,879 A * 2/2000 Yoneyama ............. H04N 5/145
348/699

(Continued)

FOREIGN PATENT DOCUMENTS

CN 101404030 4/2009
CN 102055884 5/2011

(Continued)

OTHER PUBLICATIONS

Chinese Office Action for Chinese Application No. 2013101561992 dated Sep. 29, 2015 (5 pages).

*Primary Examiner* — Michelle Entezari
(74) *Attorney, Agent, or Firm* — Brinks Gilson & Lione

(57) ABSTRACT

An apparatus and terminal perform a method for detecting image stability in image processing. The method includes: acquiring N consecutive image frames, wherein N is an integer equal to 2 or larger; performing in each of the N consecutive image frames, the following: detecting corner points in the image frame, dividing the image frame into multiple areas, and recording distribution of the corner points in each of the multiple areas of the image frame in order to obtain a description vector of the image frame; calculating a number of areas according to the description vector of the image frame over the N consecutive image frames, wherein an existing state of the corner points has changed; determining whether the N consecutive image frames are stable, based on the number of areas which the existing state of the corner points has changed over the N consecutive image frames.

16 Claims, 5 Drawing Sheets

(51) Int. Cl.
 *G06T 7/00* (2006.01)
 *H04N 5/232* (2006.01)

(56) References Cited

U.S. PATENT DOCUMENTS

| | | | | |
|---|---|---|---|---|
| 6,661,470 | B1* | 12/2003 | Kawakami | G06G 3/2022 345/474 |
| 7,426,302 | B2* | 9/2008 | Amico | G06K 9/481 356/429 |
| 7,480,457 | B2* | 1/2009 | Uenaka | G03B 37/00 396/322 |
| 7,809,194 | B2* | 10/2010 | Zhang | G06K 9/4604 382/181 |
| 8,995,531 | B2* | 3/2015 | Cui | H04N 5/23254 375/240.16 |
| 9,147,260 | B2* | 9/2015 | Hampapur | G06T 7/2006 |
| 9,172,875 | B2* | 10/2015 | Bian | H04N 5/23254 |
| 9,195,901 | B2* | 11/2015 | Kaiser-Pendergrast | G06K 9/4604 |
| 2002/0064228 | A1* | 5/2002 | Sethuraman | H04N 19/176 375/240.12 |
| 2003/0123704 | A1* | 7/2003 | Farmer | B60R 21/01558 382/103 |
| 2004/0081239 | A1* | 4/2004 | Patti | G06T 7/2013 375/240.16 |
| 2006/0269155 | A1* | 11/2006 | Tener | G06T 3/4038 382/243 |
| 2008/0144955 | A1 | 6/2008 | Rai | |
| 2008/0309769 | A1* | 12/2008 | Albu | H04N 5/144 348/208.1 |
| 2009/0010553 | A1* | 1/2009 | Sagawa | H04N 19/52 382/236 |
| 2010/0034428 | A1* | 2/2010 | Fukunishi | G06T 7/2013 382/107 |
| 2012/0275521 | A1* | 11/2012 | Cui | H04N 5/23254 375/240.16 |
| 2013/0315571 | A1* | 11/2013 | Park | H04N 19/00696 386/329 |

FOREIGN PATENT DOCUMENTS

CN 102222348 10/2011
KR 20090078274 7/2009

* cited by examiner

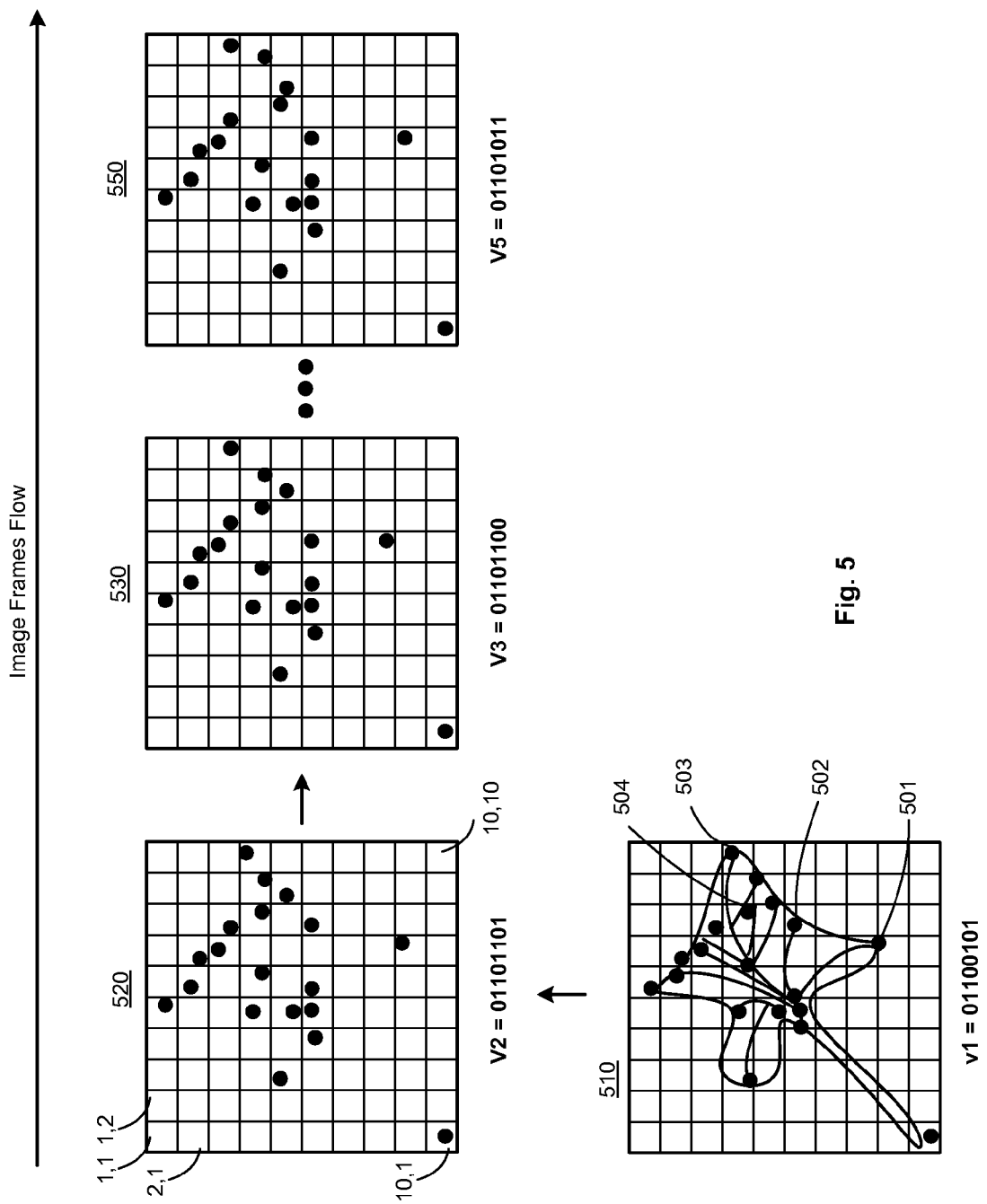

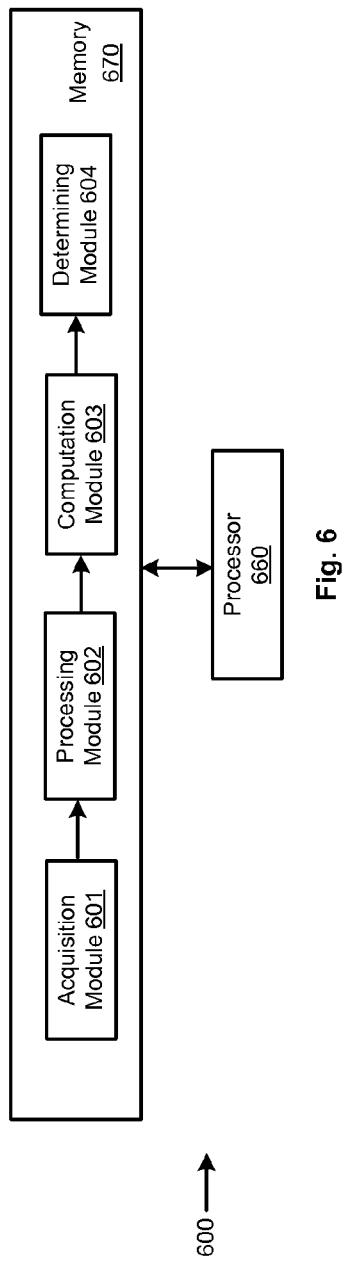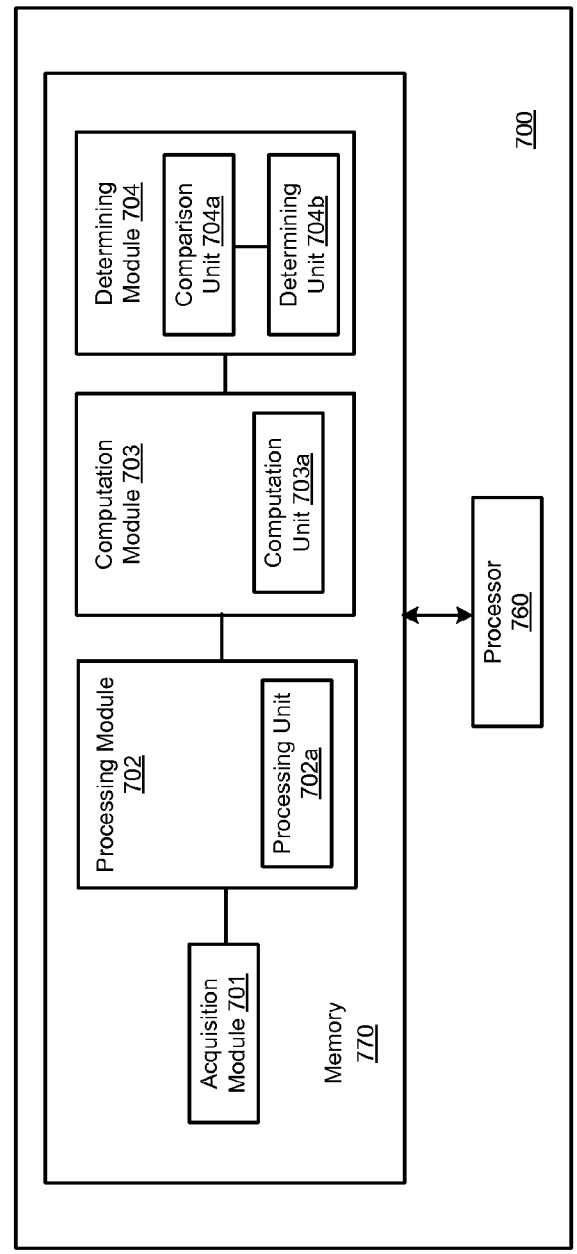

METHOD, APPARATUS AND TERMINAL FOR DETECTING IMAGE STABILITY

CROSS-REFERENCE TO RELATED APPLICATIONS

The application is a continuation of PCT Application No. PCT/CN2013/085549, filed on Oct. 21, 2013, which claims priority to Chinese Patent Application No. 2013101561992, filed on Apr. 28, 2013, which are incorporated by reference in their entireties.

FIELD OF THE TECHNOLOGY

The present disclosure is about image processing, especially for a method, apparatus, and terminal for detecting image stability.

BACKGROUND

Image stability means an image which contains legal objects possessing sharpness within a permissible range. Sharpness is usually measured in terms of whether the image is in focus or not, the image is blocked or not, what amplitude an image stream shakes, to name a few. Image stability detection is usually required during image pre-processing or post-processing. At present, there are two common methods of detecting image stability.

One method is based on using hardware measurements such as using a gyroscope on a terminal (e.g., current smart phones on the market) itself. The gyroscope determines whether an image is stable or not according to sensing a magnitude of mechanical shaking. The image is determined to be stable if the mechanical shaking is less than a preset magnitude threshold.

Another method is based on detecting pixel values change in an image. The method includes acquiring pixel values of certain pixel blocks in a present frame and determining whether compare the pixel values within a designated area in a next frame. If a change of pixel values is very small or below a threshold, the image is deemed stable. Therefore, image stability is determined based on pixel values changes in designated areas in the image caused by movements of the object or by the terminal itself.

Nevertheless, hardware-based detection method would place an undue reliance on the hardware environment, is limited only to terminals or devices having a gyroscope installed. The method of using pixel value detection may interpret misjudged results as image stability or instability. For example, in a situation which a target image may be completely blocked by obstacles or the target may be out of focus. In such situations, the detected image frame may have little to no change in pixel values over several image frames due to a blocked view or due to out of focus scenes, and may thus misinterpret as being a "stable" image. Accordingly, the prior art methods are both limiting and vulnerable to misjudged image results.

SUMMARY

The present disclosure provides a method, apparatus and terminal for detecting image stability. The technical schemes are described as follows.

An aspect of the disclosure discloses a method of detecting image stability, including: acquiring N consecutive image frames, wherein N is an integer equal to 2 or larger; performing in each of the N consecutive image frames, the following: detecting corner points in the image frame, dividing the image frame into multiple areas, and recording distribution of the corner points in each of the multiple areas of the image frame in order to obtain a description vector of the image frame; calculating a number of areas according to the description vector of the image frame over the N consecutive image frames, wherein an existing state of the corner points has changed; determining whether the N consecutive image frames are stable, based on the number of areas which the existing state of the corner points has changed over the N consecutive image frames.

Another aspect of the disclosure discloses an apparatus for detecting image stability, which includes at least a processor operating in conjunction with a memory and a plurality of modules, wherein the plurality of modules include: an acquisition module, which performs the function of acquiring N consecutive image frames, wherein N is an integer equal to 2 or larger; wherein in each of the N consecutive image frames, the following functions are performed by: a processing module, which performs the function of detecting corner points in the image frame, dividing the image frame into multiple areas and recording distribution of the corner points in each of the multiple areas of the image frame in order to obtain a description vector of the image frame; a computation module, which performs the function of calculating a number of areas according to the description vector of the image frame over the N consecutive image frames, wherein an existing state of the corner points has changed; a determining module, which performs the function of determining whether the N consecutive image frames are stable, based on the number of areas which the existing state of the corner points has changed over the N consecutive image frames.

Another aspect of the disclosure discloses a terminal for detecting image stability, comprises at least a processor operating in conjunction with a memory and a plurality of modules, wherein the plurality of modules include: an acquisition module, which performs the function of acquiring N consecutive image frames, wherein N is an integer equal to 2 or larger; wherein in each of the N consecutive image frames, the following functions are performed by: a processing module, which performs the function of detecting corner points in the image frame, dividing the image frame into multiple areas and recording distribution of the corner points in each of the multiple areas of the image frame in order to obtain a description vector of the image frame; a computation module, which performs the function of calculating a number of areas according to the description vector of the image frame over the N consecutive image frames, wherein an existing state of the corner points has changed; a determining module, which performs the function of determining whether the N consecutive image frames are stable, based on the number of areas which the existing state of the corner points has changed over the N consecutive image frames.

The present disclosure provides beneficial improvements by: utilizing detected corner points of each image frame over N consecutively acquired image frames, dividing each image frame into multiple areas and recording the distribution of the corner points in every subdivided area so as to obtain a description vector of each image frame; calculating a number of subdivided areas out of the total multiple areas in which an existing state of corner points has changed according to the description vector over the N consecutive image frames, and determining whether the N consecutive image frames are stable according to the number of subdivided areas with changes to the corner points existing states.

The present disclosures do not rely on the use of a gyroscope, and is not based on detecting pixel values within each subdivided area. In addition, the present disclosures rely upon detection of corner points on an actual image taken, which is intuitive and is based on actual perceived results which are more conspicuous for detection, and is less susceptible to be affected by the quality of the image itself (i.e., blocked by obstacle or not or being out of focused or not).

Accordingly, the present disclosures improve image stability detection and may expand to many image processing applications by reducing errors caused by misjudgment image frames (caused by target blocking and out of focus image frames), as well as eliminating the requirement of using a gyroscope hardware in the device.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims.

FIG. 5 is an exemplary diagram illustrating dividing an image frame into multiple areas for calculating a number of areas where existing state of corner points has changed according to description vectors over N consecutive image frames, according to some embodiments of the present disclosure.

FIG. 6 is an exemplary block diagram of an apparatus for detecting image stability, according to an embodiment of the present disclosure.

FIG. 7 is an exemplary block diagram of an apparatus for detecting image stability, according to another embodiment of the present disclosure.

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, the newly added features, or features that are different from those previously described in each new embodiment will be described in details. Similar features will be referenced back to the prior descriptions.

Figure 1:
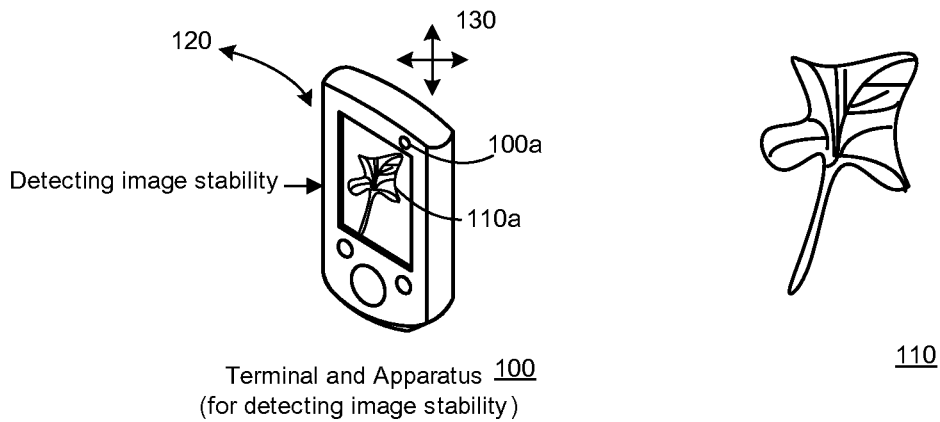
FIG. 1 is an exemplary diagram illustrating detecting image stability via an apparatus or a terminal, according to an embodiment of the present disclosure.

FIG. 1 is an exemplary diagram illustrating detecting image stability via an apparatus or a terminal (100). The apparatus or terminal (100) may be a smart phone, a tablet device, a fixed camera or video camera, a target tracker, a computing device or any photographic equipment configured to acquire consecutive image frames of an object (110).

The apparatus or terminal (100) may acquire image frames on the object (110) using an image acquisition device, such as a fixed camera or a video camera (100a). An image (110a) may be displayed on the apparatus or terminal (100), where image stability detection may be carried out in real time to detect for image instability caused by shaking or tilting movements (e.g., such as rotational (120) or vertical/horizontal (130) to the apparatus or terminal (100).

The image (110a) may be recorded or stored into the apparatus, or streamed to a remote database for further analysis or applications, after it has been detected that the image (110a) is stable enough. Such image stability detection may find applications including point and shoot still picture or video photography, image or pattern recognition, instant image scan to acquire information from a database stored in a cloud, video phone or web conferencing, to name a few.

Figure 2:
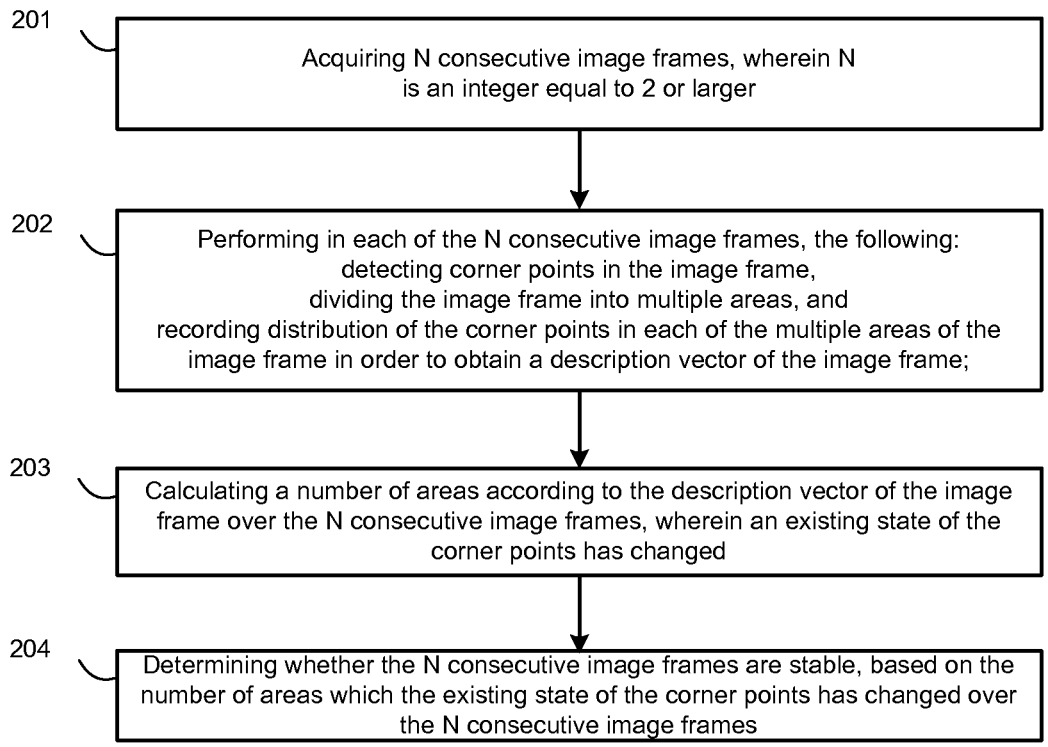
FIG. 2 is an exemplary process flow diagram depicting a method for detecting image stability, according to some embodiments of the present disclosure.

FIG. 2 is an exemplary process flow diagram depicting a method for detecting image stability, according to an embodiment of the present disclosure. The method includes at least the steps of:

Step 101: acquiring N consecutive image frames, wherein N is an integer equal to 2 or larger. The acquired N consecutive image frames can be any number of continuous and consecutive image frames. In an embodiment, N may be at least 3 or 5. Other integers may be used without limiting the embodiments of the disclosure.

Step 102: performing in each of the N consecutive image frames, the following: detecting corner points in the image frame, dividing the image frame into multiple areas (i.e., subdivided areas), and recording distribution of the corner points in each of the multiple areas of the image frame in order to obtain a description vector of the image frame.

Step 103: calculating a number of areas according to the description vector of the image frame over the N consecutive image frames, wherein an existing state of the corner points has changed.

Step 104: determining whether the N consecutive image frames are stable, based on the number of areas which the existing state of the corner points has changed over the N consecutive image frames.

It should be noted that if the N consecutive image frames are determined to be "stable", it means that there are no changes in the existing state of the corner points or the changes in the existing state of the corner points in the total number of areas (i.e., subdivided areas) are below a preset threshold over the N consecutive image frames. If the N consecutive image frames are determined to be "unstable", it means that the changes to the existing state of the corner points of the total number of areas (i.e., subdivided areas) have exceeded a preset threshold over the N consecutive image frames.

Corner points are a class of image descriptors with rich textures information. Corner points may describe the prominent parts of an image, but more emphasis may be put on an existence of the target.

The method described above may be combined with a fourth mode of operation. For example, the record recording of each of the M areas whether there exists a corner point for obtaining the description vector of the image based on obtaining the length of M, including:

for each area in the M areas, if there exists corner points, it will be recorded as "1", if there exists no corner points it will be recorded as "0", wherein the recorded "1"s are utilized to obtain the description vector of each image in order to obtain the length of M.

The embodiments provided in the above described methods do not rely on the use a gyroscope hardware. Furthermore, the detecting is based on detecting the changes of the distribution of corner points in the divided areas of the image frame, which is far more intuitive and conspicuous to detect, instead of comparing the pixel values of the image frame.

Figure 3:
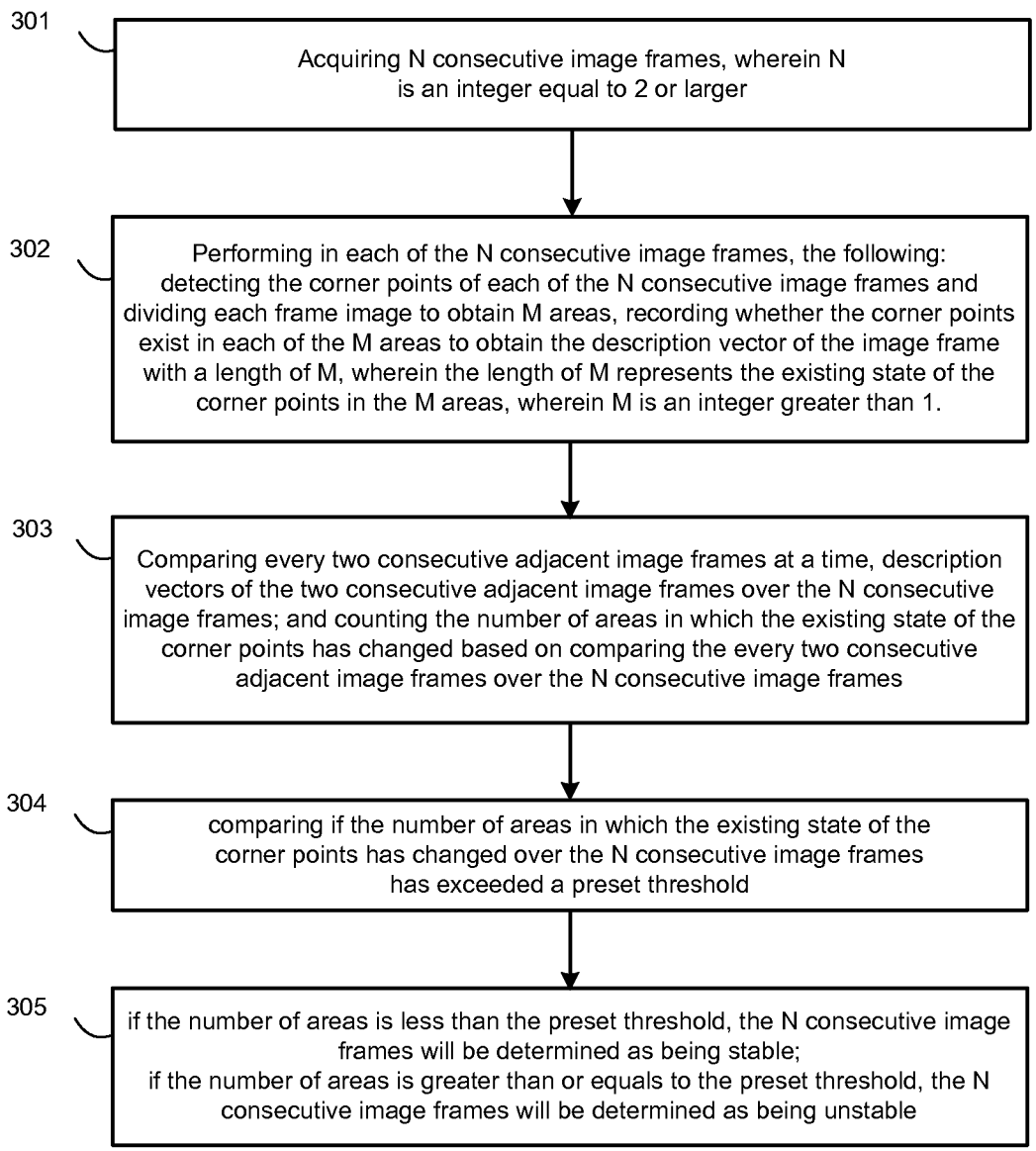
FIG. 3 is an exemplary process flow diagram depicting a method for detecting image stability, according to some embodiments of the present disclosure.

FIG. 3 is an exemplary process flow diagram depicting a method for detecting image stability, according to some embodiments of the present invention.

Step 301 of FIG. 3 is similar to step 201 of FIG. 2: acquiring N consecutive image frames, wherein N is an integer equal to 2 or larger. N may be set to 3 or 5, which is not limiting in the embodiments.

Step 302 of FIG. 3 is similar to step 202 of FIG. 2, except that in Step 302: each of the N consecutive image frames may be divided to obtain M areas (i.e., subdivided areas), wherein M is an integer greater than 1. In the preferred embodiment, the M areas may be obtained by dividing the image frame into M squares each having the same shape and size (see FIG. 5). In other embodiments, the M subdivided areas may be divided into shapes such as rectangles, triangles, circular sectors, parallelograms, hexagons etc. Preferably, the M subdivided areas may all be equal in size or area.

The corner points existing in each of the M (subdivided) areas may be recorded to obtain a description vector of the image frame with a length of M. The length of M represents the existing state of the corner points in the M areas. When recording which of the areas among the M areas have a corner point, the subdivided areas are recorded following a same order.

Preferably, the order may be according to an acquired sequence number which corresponds to a unique subdivided area in the M areas. The sequence number follows an order starting from left to right and from top to bottom. Therefore, recording whether there are corner points in the M subdivided areas follow the order of left to right and top to bottom, thus to obtain a description vector with a length of M.

Step 303 may be similar to step 203 in FIG. 2, except that in step 303, the calculating of a number of areas according to the description vector of the image frame over the N consecutive image frames may be performed by comparing every two consecutive adjacent image frames at a time, description vectors of the two consecutive adjacent image frames over the N consecutive image frames; and counting the number of areas in which the existing state of the corner points has changed based on comparing the every two consecutive adjacent image frames over the N consecutive image frames.

For the two adjacent image frames, if corner points exist in a previous frame but no corner points exist in certain areas of the M areas in the next frame; or vice versa, if there are no corner points in the previous frame but there are corner points in the next frame in certain areas of M areas, then the existing state of the corner points in certain areas of the M areas is considered to have changed.

The extent of corner point changes in the existing state may reflect the stability of the image. The more areas in which the existing state of corner points has changed in an image, the more unstable is the image. On the contrary, the less areas in which the existing state of corner points has changed in an image, the more stable is the image.

In this regard, if a video is stationary, it means that there should be no change of the existing state of the corner points, and the image should be in the most stable state. Using the scenario that supposed a video may be in motion (i.e., caused by hand movements to the terminal (100)), yet the object (110) may be blocked by an obstacle to view the image (110a), or if a focal length has changed, the present method disclosed would still be able to detect at least some corner points of the blocked object from the image, and comparing for changes of the existing state of the corner points from image frame to the next adjacent image frame to conclude that there may be instability in the blocked image (instead of misjudging the blocked image as stable).

Therefore, the detection of image stability based on a change of the distribution of corner points over consecutive adjacent image frames may improve accuracy of stability detection, and reduces the misjudgment.

Step 304 similar to step 204 in FIG. 2, with the determining of whether the N consecutive image frames are stable according to the number of areas in which the existing state of the corner points has changed over N consecutive image frames, may include: comparing if the number of areas in which the existing state of the corner points has changed over the N consecutive image frames has exceeded a preset threshold; if the number of areas is less than the preset threshold, the N consecutive image frames will be determined as being stable; if the number of areas is greater than or equals to the preset threshold, the N consecutive image frames will be determined as being unstable. The preset threshold may be set and adjusted according to needs, which is not limiting in the embodiment.

Step 305: if the number of areas is less than the preset threshold, the N consecutive image frames will be determined as being stable; if the number of areas is greater than or equals to the preset threshold, the N consecutive image frames will be determined as being unstable.

Figure 4:
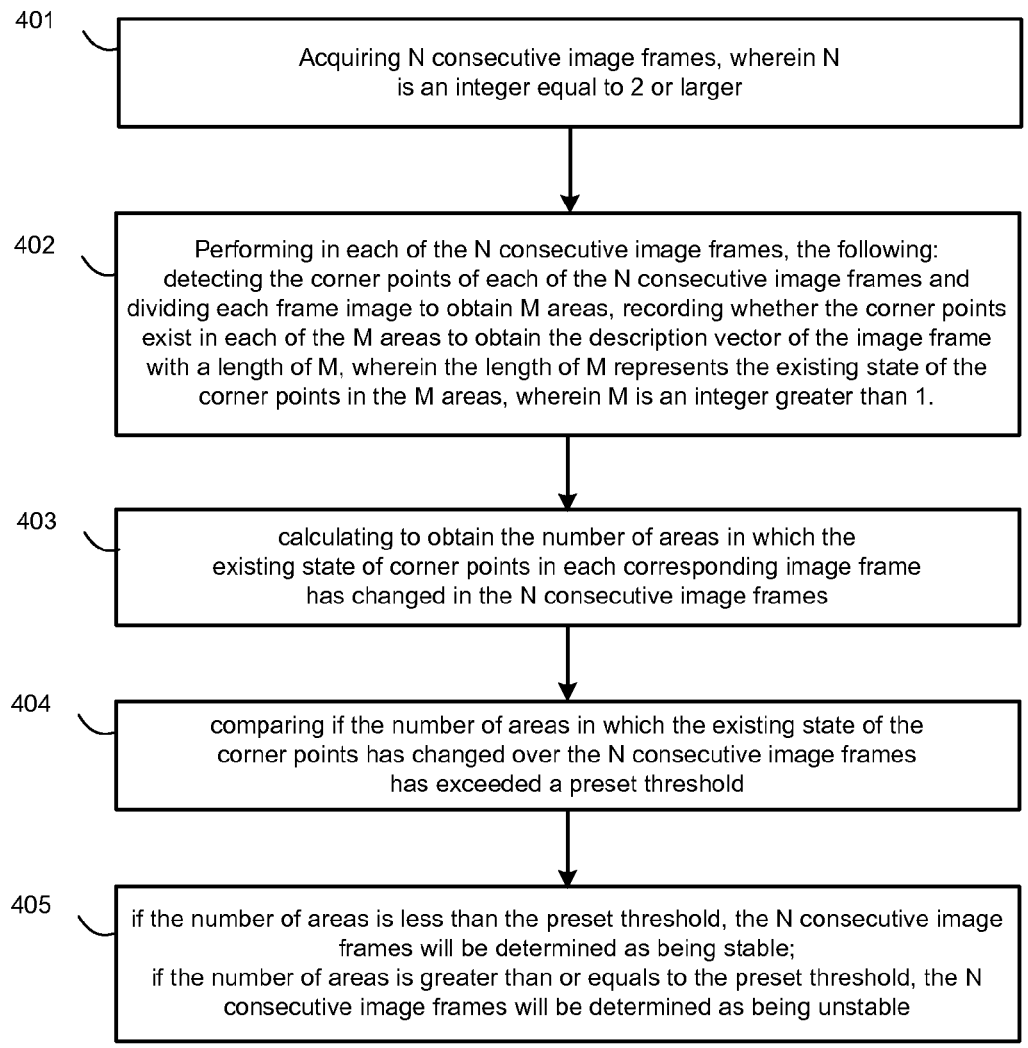
FIG. 4 is an exemplary process flow diagram depicting a method for detecting image stability, according to some embodiments of the present disclosure.

FIG. 4 is an exemplary process flow diagram depicting a method for detecting image stability, according to some embodiment of the present invention. Some of the steps are similar to those described in FIGS. 2 and 3.

Step 401 of FIG. 4 is similar to step 301 of FIG. 3: acquiring N consecutive image frames, wherein N is an integer equal to 2 or larger. N may be set to 3 or 5, which is not limiting in the embodiments.

Step 402 of FIG. 4 is similar to step 302 of FIG. 3: Performing in each of the N consecutive image frames, the following: detecting the corner points of each of the N consecutive image frames and dividing each frame image to obtain M areas, recording whether the corner points exist in each of the M areas to obtain the description vector of the image frame with a length of M, wherein the length of M represents the existing state of the corner points in the M areas, wherein M is an integer greater than 1.

In the preferred embodiment, the M areas may be obtained by dividing the image frame into M squares each having the same shape and size (see FIG. 5). The recording of each of the M areas whether there exists a corner point for obtaining the description vector of the image based on obtaining the length of M, including: for each area in the M areas, if there exists corner points, it will be recorded as "1", if there exists no corner points it will be recorded as "0", wherein the recorded "1"s are utilized to obtain the description vector of each image in order to obtain the length of M.

A description vector may be generated in every image frame. There will be N description vectors generated over N consecutive image frames, which may be expressed as description vector flow $v_1, v_2, \ldots v_N$.

Step 403 is similar to step 203 of FIG. 2: calculating to obtain the number of areas in which the existing state of corner points in each corresponding image frame has changed in the N consecutive image frames.

There are many algorithms for detecting corner points, such as, but not limited to: FAST corner detection algorithm, Kitchen-Rosenfeld corner detection algorithm, Harris corner detection algorithm, KLT corner detection algorithm and SUSAN corner detection algorithm etc. Among the above mentioned algorithms, the FAST corner detection algorithm has the fastest computing speed and may be adopted for detecting corner points in the current exemplary embodiments of the disclosure.

Step 405 is similar to step 305 in FIG. 3: if the number of areas is less than the preset threshold, the N consecutive image frames will be determined as being stable; if the number of areas is greater than or equals to the preset threshold, the N consecutive image frames will be determined as being unstable.

FIG. 5 is an exemplary diagram illustrating dividing an image frame (500) into multiple areas (1,1, 1,2, 1,3, ... 2,1, ... 10,10) for calculating a number of areas where existing state of corner points has changed according to description vectors over N consecutive image frames, according to some embodiments of the present invention.

FIG. 5 depicts that N (i.e., N=5) consecutive image frames (510, 520, ... 550) of the object (110) in FIG. 1 has been acquired by the terminal (100) (i.e., step 401 in FIG. 4). Corner points (e.g., 501, 502, 503, 504 ... ) in each of the 5 consecutive image frames may be detected and identified using a known detection algorithm (e.g., FAST Corner detection) (i.e., step 402 in FIG. 4).

In addition, each image frame (500, 510, 520, ... 540) has been divided to obtain M equal subdivided areas. For the sake of illustration, M equal to 100, arranged into a 10×10 square array (1,1, 1,2, ... 2,1, ... 10,10) (i.e., step 202 in FIG. 2). In other words, FIG. 5 also discloses an existing state of the corner points distribution in each of the image frames (500, 510, 520, ... 540), respectively.

The recording of each of the M=100 areas whether there exists a corner point for obtaining the description vector of the image based on obtaining the length of M, including: for each area (1,1, 1,2, ... 10,10) in the M areas, if there exists corner points, it will be recorded as "1", if there exists no corner points it will be recorded as "0", wherein the recorded "1"s are utilized to obtain the description vector of each image in order to obtain the length of M. For example, a "1" will be recorded for area (10,1) in all of the image frames (510, 520, 530, ... 550), and a "0" will be recorded for areas (1,1 to 9,1) in all of the image frames (500, 510, 520, ... 540), and so forth.

There will be N (N=5) description vectors generated over 5 consecutive image frames (510, 520, ... 550), which may be expressed as description vector flow $v_1, v_2, ... v_N$. To obtain the description vector (v1, v2, ... vn) of the image frame, the distribution of the corner points (e.g., 501, 502, 503, 504 ... ) in each of the multiple areas of the N image frames (510, 520, ... 550) have been recorded according to a sequence following an order of the array (1,1, 1,2, ... 2,1, ... 10,10) (i.e., step 402 in FIG. 2).

For example, five corresponding description vectors: v1=01100101, v2=01101101, v3=01101100, v4=00101110, v5=01101011 may be acquired in the 5 continuous consecutive frames (510 to 550).

To calculate a number of areas where an existing state of the corner points has changed according to the description vector of each image frame in the N consecutive image frames, the FAST corner detection algorithm may be executed according to the following formula:

$$S = \sum_{i=1}^{N-1} xor(v_i, v_{i+1})$$

wherein, S is the number of areas in which the existing state of corner points has changed in the N consecutive image frames, xor(•,•) is the XOR operation in binary streams, $v_i$ is the description vector of the i-th image frame, $v_{i+1}$ is the description vector of the (i+1)th image frame, i is an integer and i=1, ... , N−1. Σ is the sum of the number of different bits in XOR results, i.e. the sum of the number of binary 1 in XOR results.

The XOR operation of binary stream means conducting XOR operation of the number on the same numerical digits in two binary stream, e.g. the first numerical digit of the first binary stream is 1, the first numerical digit of the second binary stream is 0, so the result is 1 after conducting XOR operation on the first numerical digit, which indicates the existing state of the corner points has changed in the area corresponding to the first numerical digit; the second numerical digit of the first binary stream is 1, the second numerical digit of the second binary stream is 1, so the result is 0 after conducting XOR operation on the second numerical digit, which indicates the existing state of the corner points doesn't change in the area corresponding to the second numerical digit.

After obtaining N−1 results of XOR operations, conducting summing operation to obtain the sum of which the XOR result is 1, i.e. obtain the number of areas in which the existing state of the corner points has changed in N consecutive image frames.

For example, the obtained 5 corresponding description vectors which are: v1=01100101, v2=01101101, v3=01101100, v4=00101110, v5=01101011. Conducting XOR operation on v1 (v1=01100101) and v2 (v2=01101101) may obtain 00001000, wherein the number of different bits is 1 (i.e., XOR result contains only one binary 1). Conducting XOR operation on v2 (v2=01101101) and v3 (v3=01101100) to obtain 00000001, wherein the number of different bits is also 1 (i.e. XOR result contains only one binary 1). Conducting XOR operation on v3 (v3=01101100) and v4 (v4=00101110) to obtain 01000010, wherein the number of different bits is 2 (i.e. XOR result contains two binary 1). Conducting XOR operation on v4 (v4=00101110) and v5 (v5=01101011) to obtain 01000101, wherein the number of different bits is 3 (i.e. XOR result contains three binary 1).

Finally, conducting summing on the numbers of the different bits in the four XOR results, i.e. 1+1+2+3=7, thus obtaining the number in which the existing state of the corner points has changed over the five consecutive image frames (510 to 550) is 7.

A preset threshold may be set to determine whether the 5 consecutive image frames (510-550) being stable or not. For example, if the preset threshold is set at 10, then the result of 7 indicates that the 5 consecutive image frames (510-550) being stable. Conversely, if the preset threshold is set at 6, then the result of 7 indicates that the 5 consecutive image frames (510-550) being unstable.

In the above embodiment, for the two adjacent image frames (i.e., 520, 530), if there are corner points in the previous frame (i.e., 510) but there are no corner points in the next frame (530) in certain area of M areas, or if there are no corner points in the previous frame (i.e., 510) but there are corner points in the next frame (i.e., (530) in certain area of M areas, the existing state of the corner points in the area is considered to have has changed.

The changes of the existing state of corner points (e.g., 501 to 504) reflect the stability of an image. The more areas in which the existing state of corner points has changed in an image, the more unstable is the image. On the contrary, the less areas in which the existing state of corner points has changed in an image, the more stable is the image.

Usually when a video is stationary, there should be no change of the existing state of the corner points such that the consecutive image frames (510 to 550) would be in the most stable state. When a video is in motion, or when obstructions or obstacle blocking happens, or the focal length has changed (as in the mentioned misjudgment scenarios in the prior art), the existing state of the corner points in the image would have been detected with changes. Consequently, the image frames (510-550) would still be accurately detected as being "unstable" without misjudgment (as opposed to being detected as "stable" using the pixel values change method or gyroscope hardware method).

Therefore, the detection of image stability based on the changes of the distribution of corner points overcomes the misjudgment problems or the requirements of using a hardware gyroscope, and may be applied to image frames stability detection in various scenarios.

It is worth mentioning that the above embodiments provide a method of detecting image stability, which can be used in a variety of applications related to images, such as pretreatment process before searching for images, image acquisition process before sending images and image recognition process etc.

The following is specific explanation taking the "sweeping" function in Wechat application as an example. A user may open Wechat application in the terminal and enables the "sweeping" function, and then the camera on the terminal may be aligned to the target. This function may perform the image stability detection process on the above taken image in real time. After determining that the image is finally stable, the image may be automatically sent to the server on the network side to obtain target-related information pertaining to the image.

For example, a user may see a target such as a book, he would like to search the web for information about the target, such as price etc., he then may use the above function in Wechat application to acquire the target's stable image and sent it to the network side, so as to perform searching for related information. In this way the user may easily obtain information about the target, it is more convenient and faster compared to that the user himself taking a picture of the target and then search the web to match the picture taken.

It may be seen that a clear image of the target may be obtained, through the image stability detection; the quality of the image may be closer to the ideal state, which provide a reliable guarantee for subsequent processing. When the user aligns the camera to the target, the image frames stream may show that it is in a steady state, and the interface display may also be smooth, thus enhancing the displaying effect of the interface.

FIG. 6 is an exemplary block diagram of an apparatus (600) for detecting image stability, according to an embodiment of the present invention. The apparatus (600) includes at least a processor (660) operating in conjunction with a memory (670) and a plurality of modules (601-604). In an embodiment, the plurality of modules (601) to (604) may be codes stored on a non-transitory memory medium, to be executed by the processor to carry out the various functions. In another embodiment, the plurality of modules (601) to (604) may be resided within other hardware or processors to perform the recited functions. The plurality of modules may include an acquisition module (601), a processing module (602), a computation module (603) and a determining module (604).

The acquisition module (601) may perform the function of acquiring N consecutive image frames, wherein N is an integer equal to 2 or larger.

In each of the N consecutive image frames: the processing module (602) may perform functions of detecting corner points in the image frame, dividing the image frame into multiple areas and recording distribution of the corner points in each of the multiple areas of the image frame in order to obtain a description vector of the image frame.

In each of the N consecutive image frames: the computation module (603) may perform the functions of calculating a number of areas according to the description vector of the image frame over the N consecutive image frames, wherein an existing state of the corner points has changed.

In each of the N consecutive image frames: the determining module (604) may perform the functions of determining whether the N consecutive image frames are stable, based on the number of areas which the existing state of the corner points has changed over the N consecutive image frames.

Wherein the acquired N consecutive image frames can be any continuous N consecutive image frames, and the value of N can be set as needed, e.g. N is set to 3 or 5 etc., which shall not be specifically limited by the embodiment.

FIG. 7 is an exemplary block diagram of an apparatus for detecting image stability, according to another embodiment of the present invention. The apparatus (700) is similar to the apparatus or terminal (600) as shown in FIG. 6, with additional details to the following processing module (702), the (computation module (703) and the determining module (704).

The processing module (702) may include a processing unit (702a) which performs the function of detecting the corner points of each of the N consecutive image frames and dividing each frame image to obtain M areas, recording whether the corner points exist in each of the M areas to obtain the description vector of the image frame with a length of M, wherein the length of M represents the existing state of the corner points in the M areas, wherein M is an integer greater than 1.

Wherein there are many algorithms for detecting corner points, such as FAST corner detection algorithm, Kitchen-Rosenfeld corner detection algorithm, Harris corner detection algorithm, KLT corner detection algorithm and SUSAN corner detection algorithm etc., which will also not be specifically limited in the embodiment. In order to improve the computing speed, preferably, FAST corner detection algorithm which has the fastest computing speed can be adopted for detecting corner points.

In the embodiment, the obtained M areas by dividing have the same shape, preferably, they can be divided to obtain M square areas, of course in other mode of executions, it is possible to obtain M rectangles, M triangles, M circular sectors, M parallel quadrilaterals, M hexagons etc. by dividing, which will not be specifically limited in the embodiment. In addition, preferably, M areas have the same size, as in the preferred mode of execution; divide an image to obtain M square areas with the same size.

Wherein, when recording whether each area in M areas exists corner points, they are recorded in the same order, preferably, the recording in turn can be in accordance with the sequence number of M areas, which was acquired when dividing areas, e.g. the sequence number of M square areas is in the order of left to right and top to bottom, therefore, recording whether there are corner points in the area is the order of left to right and top to bottom, to record whether there are corner points in every area, thus to obtain a description vector with a length of M.

Combined with the apparatus described above and in the second mode of execution, the computation module (703) may include a computation unit (703a) which performs the function of comparing the description vectors of every two consecutive adjacent image frames over the N consecutive image frames, and counting the number of areas in which the existing state has changed within the every two consecutive adjacent image frames to obtain the number of areas in which the existing state has changed over the N consecutive image frames.

Preferably, counting the number of areas in which the existing state of corner points has changed within every two adjacent image frames specifically: adding up all the number of areas in which the existing state of corner points has changed to get a sum that will be treated as the number of areas in which the existing state of corner points has changed in N consecutive image frames.

In the embodiment, for the two adjacent image frames, if there are corner points in the previous frame but there are no corner points in the next frame in certain area of M areas, or if there are no corner points in the previous frame but there are corner points in the next frame in certain area of M areas, the existing state of the corner points in the area may be considered to have changed. The changes of the existing state of corner points reflect the stability of an image.

Combined with the apparatus described above and in the third mode of execution, the determining module (704) may include a comparison unit (704a), which performs the function of comparing the number of areas in which the existing state of the corner points has changed in the N consecutive image frames to a preset threshold.

A determining unit (704b) which determines that If the number of areas is less than the preset threshold, the N consecutive image frames will be determined as being stable; If the number of areas is more than or equal to the preset threshold, the N consecutive image frames will be determined as being unstable. The preset threshold can be set and adjusted according to need, which will not be specifically limited in the embodiment.

Combined with the first mode of execution described above and in the fourth mode of execution, Processing unit (702a) is used to perform the function of: detecting the corner points of each frame image in the N consecutive image frames and dividing each image frame to obtain M areas, for each area in M areas, it will be recorded as 1 if the corner point exists, it will be recorded as 0 if the corner point does not exist, in order to obtain the description vector of each image frame with a length of M, wherein the length of M represents the existing state of the corner points in M areas, wherein M is an integer greater than 1.

The computation module (703) further performs the functions of:

calculating to obtain the number of areas in which the existing state of corner points has changed over the N consecutive image frames according to the description vector of each image frame according to the following formula:

$$S = \sum_{i=1}^{N-1} xor(v_i, v_{i+1})$$

wherein, S is the number of areas in which the existing state of corner points has changed over the N consecutive image frames, xor(•,•) is the XOR operation in binary streams, $v_i$ is the description vector of the i-th image frame, $v_{i+1}$ is the description vector of the (i+1)th image frame, i is an integer and i=1, ..., N−1. Σ is the sum of the number of different bits in XOR results, i.e. the sum of the number of binary 1 in XOR results.

The apparatus provided by the embodiment can perform any of the methods provided by the above methods or embodiments. The apparatus can be applied to the terminal which includes but not limited to: mobile phones, tablet computers etc.

The embodiment provides an terminal which comprises the apparatus of detecting image stability in any mode of execution as describes in FIG. 6, the specific functions of the apparatus is the same with described functions in FIG. 6, which need not be repeated here.

That is to say the terminal provided by the embodiment can perform any of the methods provided by the above method embodiment, for the detailed process please see the description in the method embodiment, which need not be repeated here. The terminal includes but not limited to: mobile phones, tablet computers, etc., which will not be specifically limited by the embodiment.

It should be understood by those with ordinary skill in the art that all or some of the steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive or flash memory. The said computer-executable commands are used to enable a computer or similar computing device to accomplish the payment validation request operations.

The foregoing represents only some preferred embodiments of the present disclosure and their disclosure cannot be construed to limit the present disclosure in any way. Those of ordinary skill in the art will recognize that equivalent embodiments may be created via slight alterations and modifications using the technical content disclosed above without departing from the scope of the technical solution of the present disclosure, and such summary alterations, equivalent has changed and modifications of the foregoing embodiments are to be viewed as being within the scope of the technical solution of the present disclosure.

What is claimed is:

1. A method for detecting image stability, comprising:
   acquiring N consecutive image frames, wherein N is an integer equal to 2 or larger;
   performing in each of the N consecutive image frames, the following:
      detecting corner points in the image frame,
      dividing the image frame into multiple areas,
      recording distribution of the corner points in each of the multiple areas of the image frame in order to obtain a description vector of the image frame;
      wherein the dividing of the image frame into multiple areas, and the recording of the distribution of the corner points in each of the multiple areas to obtain the description vector of the image frame, comprises dividing the image frame to obtain M areas, recording each of the M areas whether a corner point exists in; obtaining the description vector of the image based on a length of M, wherein the description vector indicates the existing state of the corner points in the M areas, wherein M represents an integer greater than 1, wherein for each area in the M areas, if corner points are existed in, recording as "1", if no corner points are existed in, recording as "0", wherein the recorded "1"s are utilized to obtain the description vector of each image in order to obtain the length of M;

calculating a number of areas according to the description vector of the image frame over the N consecutive image frames, wherein an existing state of the corner points has changed; and determining whether the N consecutive image frames are stable, based on the number of areas which the existing state of the corner points has changed over the N consecutive image frames.

2. The method according to claim 1, wherein the calculating of the number of areas according to the description vector of the image frame, comprises:

comparing every two consecutive adjacent image frames at a time, description vectors of the two consecutive adjacent image frames over the N consecutive image frames; and counting the number of areas in which the existing state of the corner points has changed based on comparing the every two consecutive adjacent image frames over the N consecutive image frames.

3. The method according to claim 1, wherein the determining whether the N consecutive image frames are stable, based on the number of areas which the existing state of the corner points has changed over the N consecutive image frames, comprises:

comparing if the number of areas in which the existing state of the corner points has changed over the N consecutive image frames has exceeded a preset threshold;

determining the N consecutive image frames as being stable, if the number of areas is less than the preset threshold;

determining the N consecutive image frames as being unstable, if the number of areas is greater than or equals to the preset threshold.

4. The method according to claim 1, further comprises:

calculating to obtain the number of areas in which the existing state of corner points in each corresponding image frame has changed in the N consecutive image frames, according to the description vector of each image frame according to the following formula:

$$S = \sum_{i=1}^{N-1} xor(v_i, v_{i+1})$$

wherein, S represents the number of areas in which the existing state of corner points has changed in the N consecutive image frames, $xor(\bullet,\bullet)$ represents the XOR operation in binary streams, $v_i$ represents the description vector of the i-th image frame, $v_{i+1}$ represents the description vector of the (i+1)th image frame, i represents an integer and i=1, ..., N-1.

5. An apparatus for detecting image stability, comprising at least a processor executing program codes stored in a memory, which configure the apparatus to:

acquire N consecutive image frames, wherein N represents an integer equal to 2 or larger;

wherein in each of the N consecutive image frames, the apparatus is further configured to:

detect corner points in the image frame, divide the image frame into multiple areas, record distribution of the corner points in each of the multiple areas of the image frame in order to obtain a description vector of the image frame;

wherein the dividing of the image frame into multiple areas, and the recording of the distribution of the corner points in each of the multiple areas to obtain the description vector of the image frame, comprises the apparatus configured to:

divide the image frame to obtain M areas, recording each of the M areas whether a corner point exists in; obtain the description vector of the image based on a length of M, wherein the description vector indicates the existing state of the corner points in the M areas, wherein M represents an integer greater than 1, wherein for each area in the M areas, if corner points are existed in, recording as "1", if no corner points are existed in, recording as "0", wherein the recorded "1"s are utilized to obtain the description vector of each image in order to obtain the length of M;

calculate a number of areas according to the description vector of the image frame over the N consecutive image frames, wherein an existing state of the corner points has changed; and determine whether the N consecutive image frames are stable, based on the number of areas which the existing state of the corner points has changed over the N consecutive image frames.

6. The apparatus according to claim 5, wherein the apparatus is configured to:

compare the description vectors of every two consecutive adjacent image frames over the N consecutive image frames, and count the number of areas in which the existing state has changed within the every two consecutive adjacent image frames to obtain the number of areas in which the existing state has changed over the N consecutive image frames.

7. The apparatus according to claim 5, wherein the apparatus is configured to:

compare the number of areas in which the existing state of the corner points has changed in the N consecutive image frames to a preset threshold;

determine that if the number of areas is less than the preset threshold, determine the N consecutive image frames as being stable; if the number of areas is more than or equal to the preset threshold, determine the N consecutive image frames as being unstable.

8. The apparatus according to claim 5, wherein the apparatus is configured to:

calculate to obtain the number of areas in which the existing state of corner points has changed over the N consecutive image frames according to the description vector of each image frame according to the following formula:

$$S = \sum_{i=1}^{N-1} xor(v_i, v_{i+1})$$

wherein, S represents the number of areas in which the existing state of corner points has changed over the N consecutive image frames, $xor(\bullet,\bullet)$ represents the XOR operation in binary streams, $v_i$ represents the description vector of the i-th image frame, $v_{i+1}$ represents the description vector of the (i+1)th image frame, i is an integer and i=1, ..., N-1.

9. A terminal for detecting image stability, comprises at least a processor executing program codes stored in a memory, which configure the terminal to:
- acquire N consecutive image frames, wherein N represents an integer equal to 2 or larger;
- wherein in each of the N consecutive image frames, the terminal is further configured to:
- detect corner points in the image frame,
- divide the image frame into multiple areas; and
- record distribution of the corner points in each of the multiple areas of the image frame in order to obtain a description vector of the image frame;
- wherein the dividing of the image frame into multiple areas, and the recording of the distribution of the corner points in each of the multiple areas to obtain the description vector of the image frame, comprises the apparatus configured to:
  - divide the image frame to obtain M areas, recording each of the M areas whether a corner point exists in;
  - obtain the description vector of the image based on a length of M, wherein the description vector indicates the existing state of the corner points in the M areas, wherein M represents an integer greater than 1, wherein for each area in the M areas, if corner points are existed in, recording as "1", if no corner points are existed in, recording as "0", wherein the recorded "1"s are utilized to obtain the description vector of each image in order to obtain the length of M
- calculate a number of areas according to the description vector of the image frame over the N consecutive image frames, wherein an existing state of the corner points has changed;
- determine whether the N consecutive image frames are stable, based on the number of areas which the existing state of the corner points has changed over the N consecutive image frames.

10. The terminal according to claim 9, wherein the terminal is further configured to:
- compare the description vectors of every two consecutive adjacent image frames over the N consecutive image frames, and count the number of areas in which the existing state has changed within the every two consecutive adjacent image frames to obtain the number of areas in which the existing state has changed over the N consecutive image frames.

11. The terminal according to claim 9, wherein the terminal is further configured to:
- compare the number of areas in which the existing state of the corner points has changed in the N consecutive image frames to a preset threshold;
- determine that If the number of areas is less than the preset threshold, the N consecutive image frames will be determined as being stable; If the number of areas is more than or equal to the preset threshold, the N consecutive image frames will be determined as being unstable.

12. The terminal according to claim 9, wherein the terminal is further configured to:
- calculate to obtain the number of areas in which the existing state of corner points has changed over the N consecutive image frames according to the description vector of each image frame according to the following formula:

$$S = \sum_{i=1}^{N-1} xor(v_i, v_{i+1})$$

wherein, S is the number of areas in which the existing state of corner points has changed over the N consecutive image frames, xor(•,•) is the XOR operation in binary streams, vi is the description vector of the ith image frame, vi+1 is the description vector of the i+1th image frame, i is an integer and i=1, . . . , N−1.

13. A non-transitory computer-readable storage medium having stored thereon, a computer program having at least one code section being executable by a machine for causing the machine to perform steps in detecting image stability, comprising:
- acquiring N consecutive image frames, wherein N is an integer equal to 2 or larger;
- performing in each of the N consecutive image frames, the following:
  - detecting corner points in the image frame,
  - dividing the image frame into multiple areas, and
  - recording distribution of the corner points in each of the multiple areas of the image frame in order to obtain a description vector of the image frame;
- wherein the dividing of the image frame into multiple areas, and the recording of the distribution of the corner points in each of the multiple areas to obtain the description vector of the image frame, comprises:
  - dividing the image frame to obtain M areas, recording each of the M areas whether a corner point exists in;
  - obtaining the description vector of the image based on a length of M, wherein the description vector indicates the existing state of the corner points in the M areas, wherein M represents an integer greater than 1, wherein for each area in the M areas, if corner points are existed in, recording as "1", if no corner points are existed in, recording as "0", wherein the recorded "1"s are utilized to obtain the description vector of each image in order to obtain the length of M;
  - calculating a number of areas according to the description vector of the image frame over the N consecutive image frames, wherein an existing state of the corner points has changed;
  - determining whether the N consecutive image frames are stable, based on the number of areas which the existing state of the corner points has changed over the N consecutive image frames.

14. The non-transitory computer-readable storage medium according to claim 13, wherein the calculating of the number of areas according to the description vector of the image frame, comprising:
- comparing every two consecutive adjacent image frames at a time, description vectors of the two consecutive adjacent image frames over the N consecutive image frames; and
- counting the number of areas in which the existing state of the corner points has changed based on comparing the every two consecutive adjacent image frames over the N consecutive image frames.

15. The non-transitory computer-readable storage medium according to claim 13, wherein the determining whether the N consecutive image frames are stable, based on the number of areas which the existing state of the corner points has changed over the N consecutive image frames, comprising:

comparing if the number of areas in which the existing state of the corner points has changed over the N consecutive image frames has exceeded a preset threshold;

if the number of areas is less than the preset threshold, the N consecutive image frames will be determined as being stable;

if the number of areas is greater than or equals to the preset threshold, the N consecutive image frames will be determined as being unstable.

16. The non-transitory computer-readable storage medium according to claim 13, comprises:

calculating to obtain the number of areas in which the existing state of corner points in each corresponding image frame has changed in the N consecutive image frames, according to the description vector of each image frame according to the following formula:

$$S = \sum_{i=1}^{N-1} xor(v_i, v_{i+1})$$

wherein, S represents the number of areas in which the existing state of corner points has changed in the N consecutive image frames, $xor(\cdot,\cdot)$ represents the XOR operation in binary streams, $v_i$ represents the description vector of the i-th image frame, $v_{i+1}$ represents the description vector of the (i+1)th image frame, i represents an integer and i=1, ..., N−1.

\* \* \* \* \*